(12) United States Patent
Vella

(10) Patent No.: US 6,695,792 B2
(45) Date of Patent: Feb. 24, 2004

(54) ADJUSTABLE PERINEAL HARNESS

(75) Inventor: Daira Valda Vella, Kerrie (AU)

(73) Assignee: Bewer Pty Ltd of Wingrove Park (AU)

( * ) Notice: Subject to any disclaimer, the term of this patent is extended or adjusted under 35 U.S.C. 154(b) by 0 days.

(21) Appl. No.: 09/915,860

(22) Filed: Jul. 26, 2001

(65) Prior Publication Data

US 2002/0082520 A1 Jun. 27, 2002

(30) Foreign Application Priority Data

Dec. 8, 2000 (AU) .............................................. PR2013

(51) Int. Cl.$^7$ ................................................. A61B 5/00
(52) U.S. Cl. .................... 600/573; 119/869; 604/327
(58) Field of Search .................................. 600/573, 574, 600/580; 119/867–869; 604/317, 327, 329–332, 347–353

(56) References Cited

U.S. PATENT DOCUMENTS

| 2,173,356 A | | 9/1939 | Cross |
| 2,310,505 A | | 2/1943 | Blackburn et al. |
| 2,472,186 A | * | 6/1949 | Arnold ........................ 119/869 |
| 2,536,052 A | * | 1/1951 | Gohlke ........................ 119/869 |
| 2,544,341 A | | 3/1951 | McGraw |
| 2,585,251 A | | 2/1952 | Kahlert |
| 3,036,553 A | * | 5/1962 | Gandier ........................ 119/869 |
| 3,090,356 A | | 5/1963 | Andrisani |
| 3,270,714 A | | 9/1966 | Gandier |
| 3,850,159 A | * | 11/1974 | Langley ........................ 119/869 |
| 4,502,417 A | | 3/1985 | Jenkins |
| 4,709,661 A | | 12/1987 | Mayle, Jr. |
| 4,893,587 A | * | 1/1990 | Bailey, Jr. ................... 119/869 |
| 5,738,047 A | * | 4/1998 | McNamara ................. 119/869 |
| 5,787,893 A | | 8/1998 | Hoftman |

FOREIGN PATENT DOCUMENTS

| WO | WO 97/21343 | | 6/1997 |
| WO | WO 99/57969 | | 11/1999 |
| WO | WO-00/60928 A | * | 10/2000 |
| WO | WO00/72667 | | 12/2000 |
| WO | WO-01/19282 A | * | 3/2001 |

* cited by examiner

Primary Examiner—Charles Marmor
(74) Attorney, Agent, or Firm—John A. Artz; Artz & Artz

(57) ABSTRACT

A urine collection device (10) for animals has a support portion (60), which is positioned between the buttocks of the animal, directly below the anus; and a deflector plate (80) supported by the support portion (60) and having a front contact edge (88). Arms (92) and breeching straps (112) can be tensioned to conform the front contact edge (88) of the deflector plate (80) against the buttocks of the animal to assist in deflecting faeces away from the buttocks of the animal.

10 Claims, 3 Drawing Sheets

ADJUSTABLE PERINEAL HARNESS

FIELD OF THE INVENTION

This invention relates to a device which can be adjustably harnessed against the perineal region of an animal, to facilitate the collection of urine from the animal.

BACKGROUND OF THE INVENTION

The collection of urine from pregnant mares is a substantial industry. The urine of pregnant mares includes conjugated oestrogens, which can be recovered from the urine and used in various pharmaceutical preparations. In particular, conjugated oestrogens harvested from pregnant mares are used for hormone replacement therapy in humans, and as hormone growth stimulants for other animals.

There are a variety of differing devices and methods intended to collect uncontaminated urine from mares. U.S. Pat. Nos. 3,270,714 and 3,036,553 disclose urine collection systems involving a collection unit suspended from the rear of the mare, an opening in which is intended to encircle the vulva. The unit funnels urine away from the vulva for separate storage.

U.S. Pat. No. 3,850,159 describes a related system, in which straps pass along either side of the mare's tail to suspend a extension, the end of which is positioned between the anus and vulva of the mare. Faeces falling from the anus passes over the top of the barrier extension, so that it does not contaminate the collected urine.

These and other arrangements are not entirely satisfactory. There is a distinct possibility that faeces produced by the animal may contaminate the collected urine by not being satisfactorily deflected away from the mare. There is generally an increased risk of contamination when the faeces has a relatively high liquid content, as is often the case. This can cause the faeces to run down the buttocks, making it more difficult to deflect the faeces away from the mare.

Accordingly, it is an object of the invention to attempt to address these and other limitations of the existing prior art.

SUMMARY OF THE INVENTION

The inventive concept resides in a recognition that urine can be advantageously collected from animals using a device able to be placed against buttocks in the perineum region of the animal, below the anus, and having a deflector plate profiled to match the buttocks of the animal and able to be snugly engaged against the buttocks to effectively deflect faeces away from the animal.

Accordingly, the invention provides a device suitable for use in collecting urine from animals, the device including a support portion able to be positioned between the buttocks of an animal in the perineum region of the animal, directly below the anus; a deflector plate supported by the support portion and having a front contact edge; and an engaging means attached with the deflector plate; wherein, in use, the engaging means can be tensioned to conform the front contact edge of the deflector plate against the buttocks of the animal to assist in deflecting faeces away from the buttocks of the animal.

Preferably, the support portion is integral with the deflector plate and is intended to support the deflector plate, so that it can be appropriately tensioned to conform against the profile of the animal's buttocks region below the anus. Preferably, in the case of female animals, the support portion is located to avoid any obstruction of the vulva which may otherwise encourage infection of the urinary tract, or cause discomfort to the animal. Preferably, in use, the support portion does not generally contact or rub against the buttocks of the animal, to avoid causing irritation or discomfort to the animal.

Preferably, the engaging means is integral with the deflector plate, and includes two arms, both of which extend from each end of the contact edge of the deflector plate. Preferably, each of the arms are able to be attached with engaging straps which can be attached with a harness assembly fitted to the animal, or connected to the sides of a urine collection device, in order to snugly conform the front contact edge of the deflector plate against the profile of the animal's buttocks by tensioning the arms through adjustment of the engaging straps. Preferably, the arms and the engaging straps are sleeved in a suitable material to avoid irritating the animal due to rubbing or chaffing of the arms or engaging straps against the animal.

Preferably, the engaging means also allows for adjustment of the position of the device in relation to the buttocks, side regions or semitendinosus, and perineal region of the animal by, for example, adjusting the position and tension in the engaging straps.

Preferably, in use, the contact edge of the deflector plate is snugly positioned against the profile of the buttocks of the animal, to minimise the risk of faeces running down the buttocks of the animal, to avoid contamination with collected urine.

Preferably, the front contact edge of the deflector plate upwardly extends against the buttocks of the animal when the device is fitted to the animal to further assist in deflecting faeces from the buttocks of the animal. Preferably, the deflector plate extends beyond the support portion so that the front contact edge of the deflector plate can, in use, be upturned against the buttocks of the animal.

Preferably, the support portion is relatively wedge-shaped and has an outer surface which is relatively smooth, soft and pliable, to avoid irritating the animal. Preferably, the wedge-shaped profile of the support portion is shaped to locate the device between the buttocks of the animal, in the perineal region.

Preferably, the deflector plate and the engaging means are shaped and dimensioned so that the device can be successfully used with animals of varying anatomical shapes and proportions. Preferably, the integral deflector plate and engaging means are fabricated with a soft, resilient rubber material that is readily stretched to conform against the buttocks of differently shaped animals. Preferably, the deflector plate and engaging means are able to be used on mares which have a relatively narrow and deep buttocks region, as well as cows, which have a relatively broad and shallow buttocks region, particularly dairy cattle and other breeds which have an anus and vulva which is relatively deeply set from the rear of the buttocks.

Preferably, the device provides a relatively comfortable fit for the animal when the device is attached to the buttocks of the animal. Preferably, the device, which in use is pulled directly against the buttocks of the animal via the engaging means, is stably positioned so that it is unlikely to slip out of place during ordinary movement of the animal such as, for example, in the case of mares, while the mare is trotting or cantering, or when lying down.

Preferably, the contact edge of the deflector plate provides, with appropriate pressure from the engaging means, a relatively tight and sealing engagement against the buttocks of the animal. Preferably, when so used, the deflector plate is able to deflect faeces with a relatively high liquid content which might otherwise run down the buttocks of the animal thereby contaminating urine collected from the animal.

BRIEF DESCRIPTION OF DRAWINGS

The invention will now be described by way of example only, with reference to the accompanying drawings, in which.

DESCRIPTION OF PREFERRED EMBODIMENTS

Figure 1:
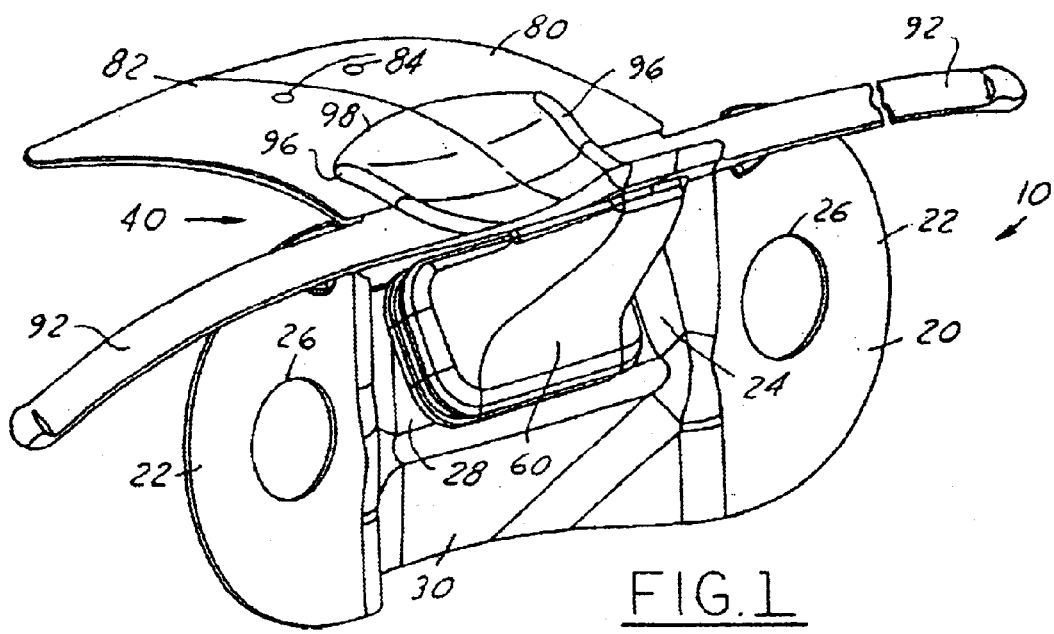
FIG. 1 is a perspective view of the components of a device constructed in accordance with an embodiment of the invention.
Figure 4:
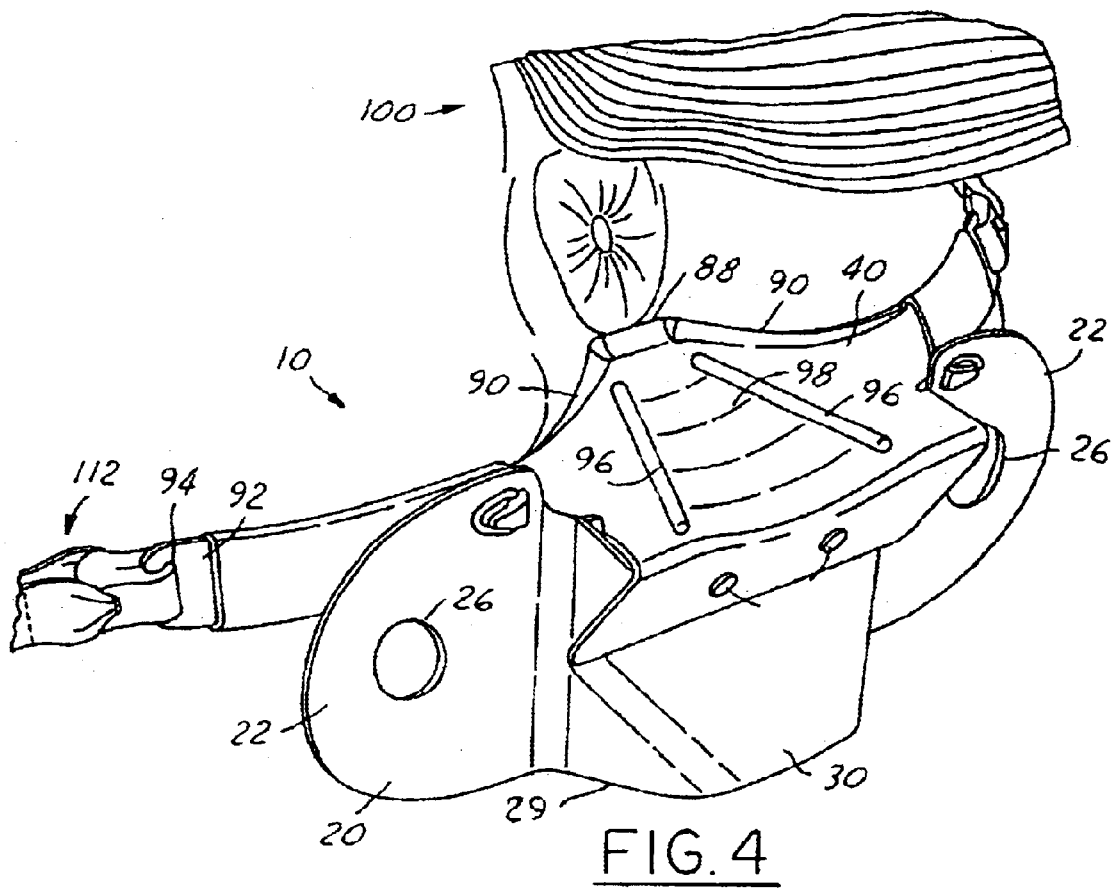
FIG. 4 is a view illustrating the device of FIG. 1 when fitted to a horse.

A preferred embodiment of an adjustable perineal harness device 10, for facilitating the collection of urine, is illustrated in FIG. 1. The device 10 includes two primary integral components, a base plate 20 and a body 40. As illustrated in FIG. 1, the body 40, which includes a support portion 60 and a deflector plate 80, engages the base plate 20 to form a unit which can be clamped against the buttocks region of a mare 100, to assist in the collection of urine from the mare 100, as indicated in FIG. 4. The device 10 is fitted to the mare with the assistance of an engaging means in the form of arms 92 and co-operating external straps 112 which are fitted to a harness assembly as later described in the context of the drawings.

Figure 2:
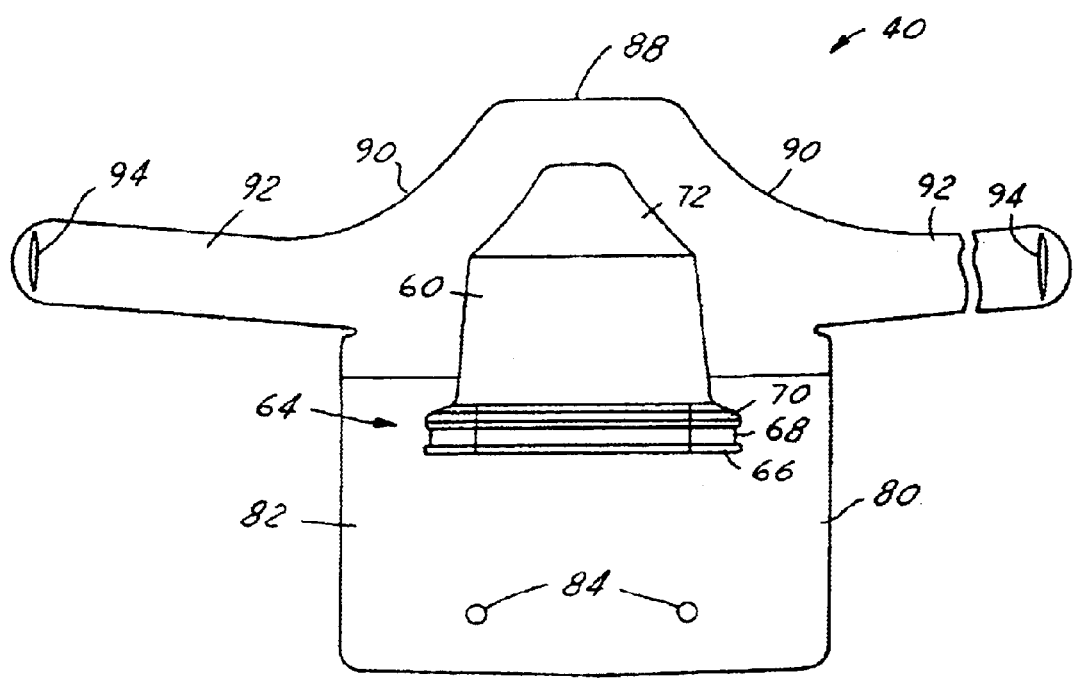
FIG. 2 is a view from the underside of one component of the device of FIG. 1.
Figure 3:
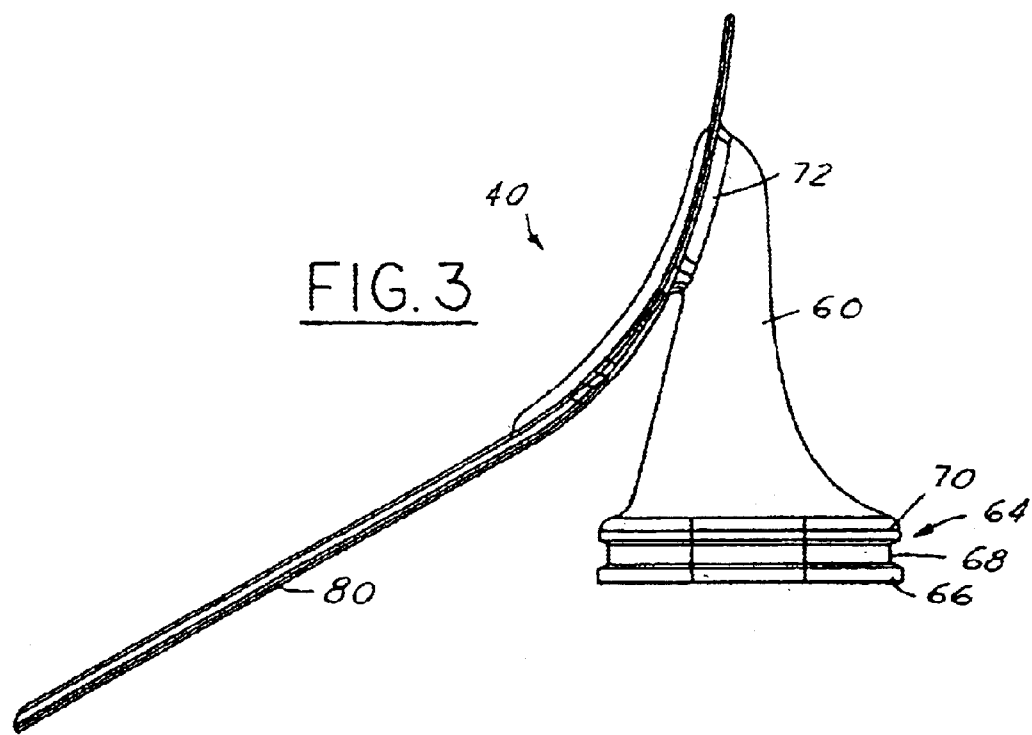
FIG. 3 is a side view corresponding with FIG. 2.

FIGS. 2 and 3 are two views of the body 40 of the device 10. The support portion 60 and the deflector plate 80 are integral with each other. The support portion 60 ends in an engaging portion 64 which is of a generally rectangular shape. At the other end of the support portion 60 there is a tip 72 which attaches the support portion 60 with the deflector plate 80.

The engaging portion 64 involves a base 66 and a shoulder 70 which together define a channelled groove 68 extending around the periphery of the engaging portion 64. The engaging portion 64 of the support portion 60 is adapted to be engaged with the base plate 20. To enhance the fit with which the support portion 60 engages the base plate 20, a band member (not shown) can be securely tightened within the channelled groove 68. Preferably, the band member is a cable tie such as a plastic ratchet-based fastener conventionally used in various applications.

The deflector plate 80, illustrated most clearly in FIGS. 1 and 2, has front contact edges 88, 90, namely a front edge 88 and side edges 90, as illustrated in FIG. 2. The side edges 90 extend outwardly to arms or straps 92. Slots 94 are formed near the respective ends of the arms 92, as illustrated in FIG. 2. Behind the front contact edges 88, 90 is a rear portion 82 of the deflector plate 80, in which are formed two holes 84.

As illustrated in FIG. 1, on one side of the deflector plate 80 there are two angularly positioned baffles 96 which are generally semi-circular in profile and extend outwardly from the front contact edges 88, 90 of the deflector plate 80, from near where the front edge 88 respectively joins the side edges 90. The baffles 96 extend into the rear portion 82 of the deflector plate 80. Extending between the baffles 96 is a concave trough 98.

As described above, the body 40 of the device 10 is, in use, attached with the base plate 20. The base plate 20 has two ends 22 connected by a middle portion 24, which includes a platform 28 and a chute 30. The platform 28 and the chute 30 are angled with respect to each other, and with respect to the ends 22, to assist in directing uncontaminated urine away from the vulva for separate collection. The ends 22 include holes 26 to assist in attaching the device 10 with external equipment, if and when required. The holes 26 are used to secure the deflector plate 80 securely to the body 40 of the device 10, with the use of suitable studs. The studs are welded using PVC welding to achieve a secure and stable attachment to ensure that the deflector plate 80 and the base plate 20 do not move from the prescribed relative positions.

FIG. 4 shows the device 10 when fitted to the rear of the mare 100. The support portion 60 is positioned between the buttocks of the mare 100, directly below the anus. As illustrated, the arms 92 are attached with an harness assembly 110, shown in FIG. 5, via a breaching straps 112. These breeching straps 112 engage the slots 94 in the arms 92.

As shown in FIG. 4, the base plate 20 is positioned against the rear of the mare 100, and supports the body 40. The support portion 60 is attached with and projects from the platform 28 of the base plate 20. The support 29 is angled so that the support portion 60 and the contact edges 88, 90 of the deflector plate 80 are appropriately positioned with respect to the buttocks and perineum region of the mare 100. The chute 30 is angled downwardly and outwardly to assist in collecting urine from the mare 100.

The body 40 of the device is held against the rear of the mare 100 with the assistance of the arms 92 and the breeching straps 112. The tension in the arms 92 maintains the front and side edges 88, 90 of the deflector plate in a snugly fitted engagement with the buttocks profile of the mare 100.

The tension in the straps 112 and arms 92 can be adjusted by adjusting the length of the straps 112 on each side the mare 100, depending on the size of the mare 100 and its anatomical shape in the buttocks region adjacent the anus, perineum and vulva. Preferably, when the device 10 is fitted to the mare 100, the tension in each of the breeching straps 112 is adjusted so that the desired fit is achieved. In use the edges 88, 90 of the deflector plate 80 extend upwardly against the rear of the mare 100.

This arrangement is readily achieved due to the tension provided by the 15 breeching straps 112, and as the deflector plate 80 extends over the support portion 60, as indicated in FIG. 2. As the edges 88, 90 of the deflector plate 80 are firmly engaged against the mare 100, faeces produced by the mare 100 are generally able to be captured by the deflector plate 80. Faeces is deflected away from the mare by the deflector plate 80, and then simply falls to the ground. Alternatively, the faeces can be collected separately from the urine in a pouch (not shown) located near the rear of the mare 100. This may be desirable to assist in analysing the state of the mare's health, or to study the mare's nutritional requirements.

Even if faeces produced by the mare 100 has a high liquid content such that the faeces runs down the buttocks of the mare, the snug fit of the front contact edges 88, 90 against the mare generally ensures that the faeces do not run any further down the buttocks of the mare with the possibility that they may contaminate urine collected from the mare. Further, this snug fit attempts to minimise the risk of rain or other possible contaminants (such as, dust, straw, stable bedding materials, wood shavings, flies and other insects etc) from contaminating the collected urine, particularly when the mare is permitted to roam freely outdoors.

The baffles 96 and trough 98 extending between the baffles assist in directing faeces from the mare 100 along the deflector plate 80 and to the ground. This arrangement attempts to effectively channel faeces along the deflector plate 80 and away from the buttocks of the mare 100.

The mare 100 may wear a tail guard wrapped around the tail, to reduce the possibility of any damage to the mare's tail or tail dock caused by, for example, rubbing or chaffing against the device 10, when fitted. Preferably, any tail guard is attached to the harness assembly 110 by a suitable strap, in order to support the tail as required.

Figure 5:
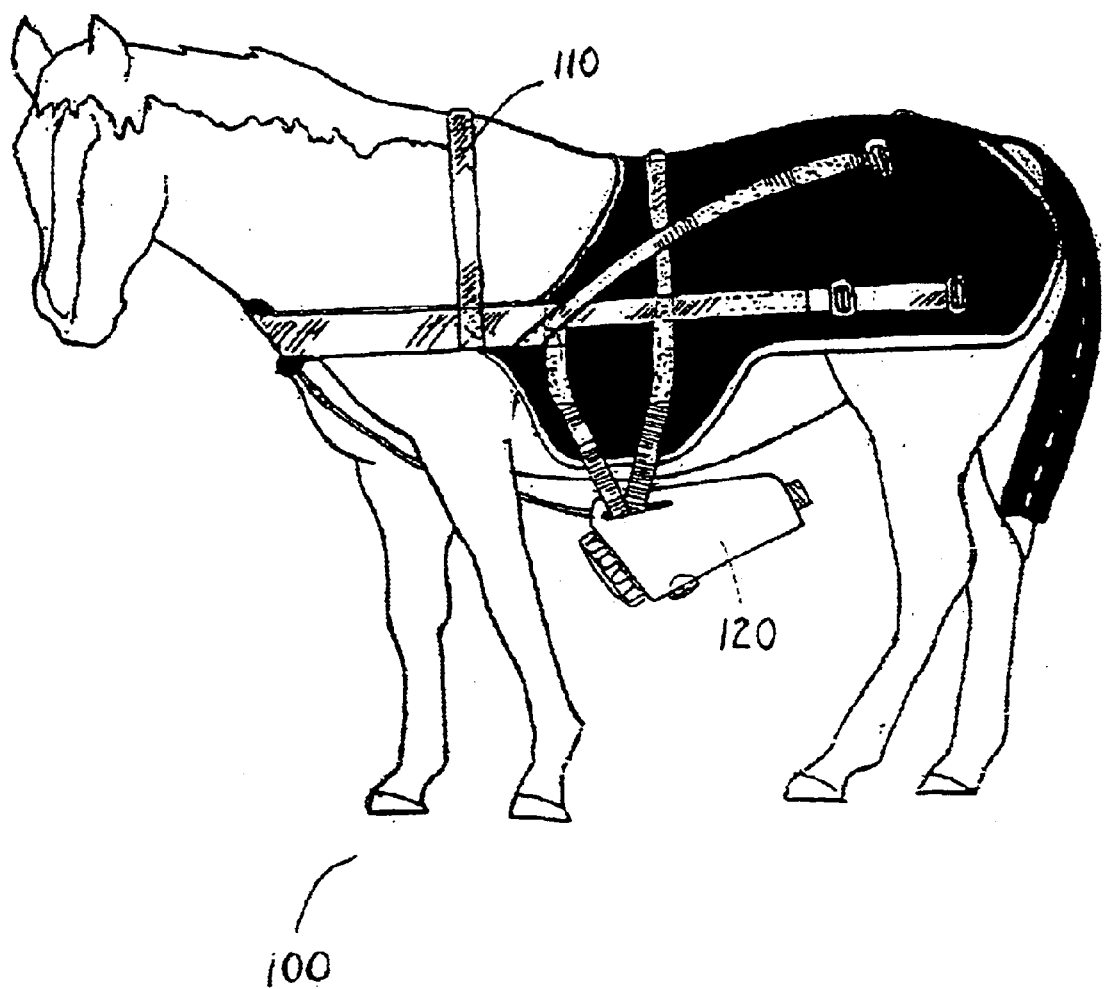
FIG. 5 is a view of a horse fitted with equipment intended to be used in conjunction with the device depicted in FIG. 4, to assist in the collection of urine.

FIG. 5 depicts the mare 100 fitted with a harness assembly 110 from which is suspended a collection device 120 for the collection of urine from the mare 110. The device 10 is not fitted. However, in use, the device 10 is fitted to the mare as illustrated in FIG. 4, and a collection tube or passage (not shown) is introduced to funnel urine from the mare's vulva to the collection device 120.

The support portion 60 may be hollow, or filled with a material such as, for example, foam, a salt solution, liquid silicon, or gel. The body 40 is preferably manufactured of a soft, slippery flexible material such as, for example, medical grade silicon or rubber. The material from which the body 40 is fabricated is intended to avoid any discomfort to the mare while snugly conforming to the contours of the mare to minimise any risk of faecal contamination of collected urine.

In use, the device 10 is able to be readily replaced with a similar device, as required, for example, when the original becomes soiled, or suffers general wear and tear.

Further, it is preferred that the material of at least the deflector plate 80 is sufficiently flexible so that it is able to be stretched by tension through the breeching straps 112 to conform to the differing contours of different animals. Prior art arrangements are generally designed to be used with a particular animal, such as a mare and, accordingly, the same unit is generally unable to be successfully be used with other types of animals with little, if any, modification.

The front contact edges 88, 90 of the deflector plate 80 are, due to their configuration with respect to the support portion 60, intended to be able to conform to mares having different profiled buttocks regions. Preferably the deflector plate 80 is able to conform to the buttocks regions of various different animals of comparable size, for example, cows. It is intended that manufactured devices 10 are able to be equally well used with animals other than mares such as, for example, cows, sows, donkeys, as well as other similarly proportioned animals.

The system, as described above, provides a means for assisting with the collection of urine from animals in which the device is directly "pulled" against the buttocks of the animal rather than, as is the case with various alternative arrangements, pushed or suspended against the perineum region of the animal. The benefits of this approach are apparent from the above, and include the advantages of a generally improved fit against the profile of the animal's buttocks to assist in deflecting faeces and other possible contaminants away from the animal, and the site of urine collected from the animal, without causing significant irritation or discomfort to the animal or obstructing the flow of urine which can result in local infection.

It will be understood that the invention disclosed and defined in this specification extends to all alternative combinations of two or more of the individual features mentioned or evident from the text or drawings. All of these different combinations constitute various alternative aspects of the invention.

The claims defining the invention are as follows:

1. A device suitable for use in collecting urine from animals, the device including a support portion adapted to be positioned between the buttocks of an animal in the perineum region of the animal, directly below the anus; a deflector plate integral with and supported by the support portion and having a front contact edge; and engaging arms integral with the deflector plate and respectively extending from ends of the front contact edge of the deflector plate; wherein, in use, the engaging arms are adapted to be tensioned to conform the front contact edge of the deflector plate against the buttocks of the animal below the anus, so that the front contact edge of the deflector plate is adapted to extend upwardly against the buttocks of the animal, to assist in deflecting faeces away from the buttocks of the animal.

2. The device according to claim 1, wherein each of the engaging arms is adapted to be attached with respective engaging straps attached to a harness assembly fitted to the animal.

3. The device according to claim 2, wherein the engaging arms and the engaging straps are sleeved in a suitable material to avoid irritating the animal due to rubbing or chaffing of the engaging arms against the animal.

4. The device according to claim 3, wherein the engaging arms are adapted to adjust the position of the device in relation to the buttocks, side regions or semitendinosus, and perineal region of the animal.

5. The device according to claim 1, wherein the deflector plate extends beyond the support portion so that the front contact edge of the deflector plate is adapted to be upturned against the buttocks of the animal.

6. The device according to claim 1, wherein the support portion is wedge-shaped and has an outer surface which is smooth, soft and pliable.

7. The device according to claim 1, wherein the profile of the support portion is shaped to locate the device between the buttocks of the animal, in the perineal region.

8. The device according to claim 1 wherein the deflector plate and an engaging means are shaped and dimensioned so that the device is adapted to be used with animals of varying anatomical shapes and proportions.

9. The device according to claim 1, wherein the deflector plate and engaging arms are fabricated with a soft, resilient rubber material that is adapted to be stretched to conform against the buttocks of differently shaped animals.

10. The device according to claim 1, wherein the front edge of the deflector plate is adapted to achieve sealing engagement against the buttocks of the animal when the engaging arms are tensioned.

* * * * *